(12) United States Patent
Nakamura et al.

(10) Patent No.: US 7,881,947 B2
(45) Date of Patent: Feb. 1, 2011

(54) CONTENT INFORMATION SALES MANAGEMENT METHOD AND DISTRIBUTION MANAGEMENT METHOD

(75) Inventors: Takatoshi Nakamura, Kanagawa (JP); Mitsuru Takehara, Tokyo (JP); Masamichi Asukai, Kanagawa (JP); Motoyuki Takai, Tokyo (JP); Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 1210 days.

(21) Appl. No.: 11/502,174

(22) Filed: Aug. 10, 2006

(65) Prior Publication Data

US 2007/0038470 A1 Feb. 15, 2007

(30) Foreign Application Priority Data

Aug. 15, 2005 (JP) ............................. 2005-235109

(51) Int. Cl.
*G06Q 99/00* (2006.01)
(52) U.S. Cl. ....................................... 705/1.1; 705/14.1
(58) Field of Classification Search ................. 705/1.1, 705/14.1
See application file for complete search history.

(56) References Cited

U.S. PATENT DOCUMENTS

| 2002/0178271 | A1* | 11/2002 | Graham et al. | 709/229 |
| 2003/0037261 | A1* | 2/2003 | Meffert et al. | 713/201 |
| 2003/0195851 | A1* | 10/2003 | Ong | 705/50 |
| 2004/0059929 | A1* | 3/2004 | Rodgers et al. | 713/193 |
| 2005/0160053 | A1* | 7/2005 | Okamoto et al. | 705/67 |

FOREIGN PATENT DOCUMENTS

| JP | 2002-041826 A | 2/2002 |
| JP | 2002-063495 | 2/2002 |
| JP | 2002-083213 A | 3/2002 |
| JP | 2002-100116 A | 4/2002 |
| JP | 2003-022337 A | 1/2003 |
| JP | 2003-187092 | 7/2003 |
| JP | 2003-256597 A | 9/2003 |
| JP | 2003-288530 | 10/2003 |
| JP | 2005-092477 A | 4/2005 |
| JP | 2001-236388 A | 8/2009 |

* cited by examiner

*Primary Examiner*—Jonathan Ouellette
(74) *Attorney, Agent, or Firm*—Wolf, Greenfield & Sacks, P.C.

(57) ABSTRACT

Disclosed herein is a content information sales management method including the steps of: causing a distribution source apparatus to distribute trial content information, trial use rules stating trial use conditions, and distribution source identification information for identifying the distribution source apparatus to a distribution destination apparatus; causing the distribution destination apparatus to upload the distribution source identification information corresponding to the trial content information to a sales source apparatus for formal content information when the distribution destination apparatus downloads the formal content information corresponding to the trial content information; and causing the sales source apparatus to update an evaluation value corresponding to the distribution source identification information in accordance with the uploaded distribution source identification information.

12 Claims, 5 Drawing Sheets

PREVIEW DATA

FIG.4A

| ITEM | CONTENTS | |
|---|---|---|
| SONG IDENTIFICATION CODE | ××××× | |
| PERMITTED REPRODUCTION COUNT | ×× | |
| PERMITTED REPRODUCTION PERIOD (1) | ×× DAYS | |
| PERMITTED REPRODUCTION STYLE (1) | ×× | |
| PERMITTED REPRODUCTION PERIOD (2) | ×× DAYS | PREVIEW RULES |
| PERMITTED REPRODUCTION STYLE (2) | ×× | |
| PERMITTED REPRODUCTION PERIOD (3) | ×× DAYS | |
| PERMITTED REPRODUCTION STYLE (3) | ×× | |
| PERMITTED DISTRIBUTION COUNT | ×× | |
| ⋮ | ⋮ | |

| | 1 | 2 | ... |
|---|---|---|---|
| SONG IDENTIFICATION CODE | ××××× | ××××× | |
| PERMITTED REPRODUCTION COUNT | ×× | ×× | |
| PERMITTED REPRODUCTION PERIOD (1) | ×× DAYS | ×× DAYS | |
| PERMITTED REPRODUCTION STYLE (1) | ×× | ×× | |
| PERMITTED REPRODUCTION PERIOD (2) | ×× DAYS | ×× DAYS | |
| PERMITTED REPRODUCTION STYLE (2) | ×× | ×× | |
| PERMITTED REPRODUCTION PERIOD (3) | ×× DAYS | ×× DAYS | |
| PERMITTED REPRODUCTION STYLE (3) | ×× | ×× | |
| PERMITTED DISTRIBUTION COUNT | ×× | ×× | |
| ⋮ | ⋮ | ⋮ | |

FIG. 5A

DISTRIBUTION SOURCE
IDENTIFICATION
INFORMATION

| 20A DISTRIBUTION SOURCE IDENTIFICATION INFORMATION |

| 20A DISTRIBUTION SOURCE IDENTIFICATION INFORMATION |
| 20B DISTRIBUTION SOURCE IDENTIFICATION INFORMATION |

| 20A DISTRIBUTION SOURCE IDENTIFICATION INFORMATION |
| 20B DISTRIBUTION SOURCE IDENTIFICATION INFORMATION |
| 20C DISTRIBUTION SOURCE IDENTIFICATION INFORMATION |

FIG. 5B

DISTRIBUTION SOURCE
IDENTIFICATION
INFORMATION

| 20A DISTRIBUTION SOURCE IDENTIFICATION INFORMATION |

| 20B DISTRIBUTION SOURCE IDENTIFICATION INFORMATION |

| 20C DISTRIBUTION SOURCE IDENTIFICATION INFORMATION |

`US 7,881,947 B2`

CONTENT INFORMATION SALES MANAGEMENT METHOD AND DISTRIBUTION MANAGEMENT METHOD

CROSS REFERENCES TO RELATED APPLICATIONS

The present invention contains subject matter related to Japanese Patent Application JP 2005-235109 filed in the Japanese Patent Office on Aug. 15, 2005, the entire contents of which being incorporated herein by reference.

BACKGROUND OF THE INVENTION

1. Field of the Invention

The present invention relates to a content information sales management method and distribution management method.

2. Description of the Related Art

Music is sold through the Internet. More specifically, when the user connects a personal computer to a music selling website and performs a predetermined procedure for purchasing a song, the song data (digital audio data that can be reproduced as a song) for the purchased song is downloaded to the personal computer. The downloaded song data can be reproduced as a song. The song data obtained in this manner can be transferred to a reproduce terminal device for reproduction purposes.

A general method for connecting the personal computer to a music selling website is to directly enter the URL (Uniform Resource Locator) for the music selling website into the personal computer and jump to the music selling website. However, when a banner advertisement page introducing a song or an affiliate's page is linked to the music selling website, clicking such a link causes a jump to the music selling website. When a music selling website is connected in this manner, and particularly when a song is purchased after making such a connection, the supplier of the banner advertisement page or the affiliate's page will be rewarded.

Therefore, the music selling system based on banner advertisements or affiliates is beneficial to both music sellers and page suppliers. Another system is also projected for recommending and selling song data through a P2P (Peer to Peer) or ad-hoc network. Such system is disclosed, for example, in Japanese Patent Laid-open No. 2003-187091, Japanese Patent Laid-open No. 2003-288530, and Japanese Patent Publication No. 2002-63495.

SUMMARY OF THE INVENTION

In a situation where the music selling system based on banner advertisements or affiliates is used, however, when a person who is planning to purchase a song bookmarks the page of a banner advertisement or affiliate and uses the bookmark to connect to a music selling site at a later date to purchase the song, the supplier of the page will not be rewarded for the purchase of the song.

Further, when you like a song recommended by a friend and purchase the song from a music selling site, the friend will not be rewarded unlike in a situation where the music selling system based on banner advertisements or affiliates is used. When you let your friend listen to a song and recommend that your friend purchase the song, you pass your terminal device to your friend. Therefore, your friend might not sufficiently listen to the recommended song. Moreover, the information for identifying the recommender or associating the recommender with the sold song is not available.

Furthermore, downloaded song data may be illegally copied or the identification information about a formal purchaser may be illegally used. In addition, it is practically may not be able to change the conditions for placing an advertisement or information about a song on a web page.

According to one aspect of the present invention, there is provided a content information sales management method comprising the steps of: causing a distribution source apparatus to distribute trial content information, trial use rules stating trial use conditions, and distribution source identification information for identifying the distribution source apparatus to a distribution destination apparatus; causing the distribution destination apparatus to upload the distribution source identification information corresponding to the trial content information to a sales source apparatus for formal content information when the distribution destination apparatus downloads the formal content information corresponding to the trial content information; and causing the sales source apparatus to update an evaluation value corresponding to the distribution source identification information in accordance with the uploaded distribution source identification information.

When user B purchases content information recommended by user A, an embodiment of the present invention rewards user A. Further, user B can readily use the content information for previewing purposes.

Furthermore, a content information selling company can readily permit the trial use of content information. Even when the content information is illegally copied, the route for making an illegal copy can be traced to inhibit an attempt to make illegal copies.

The above and other features and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

[1] Outline of the Whole System

Figure 1:
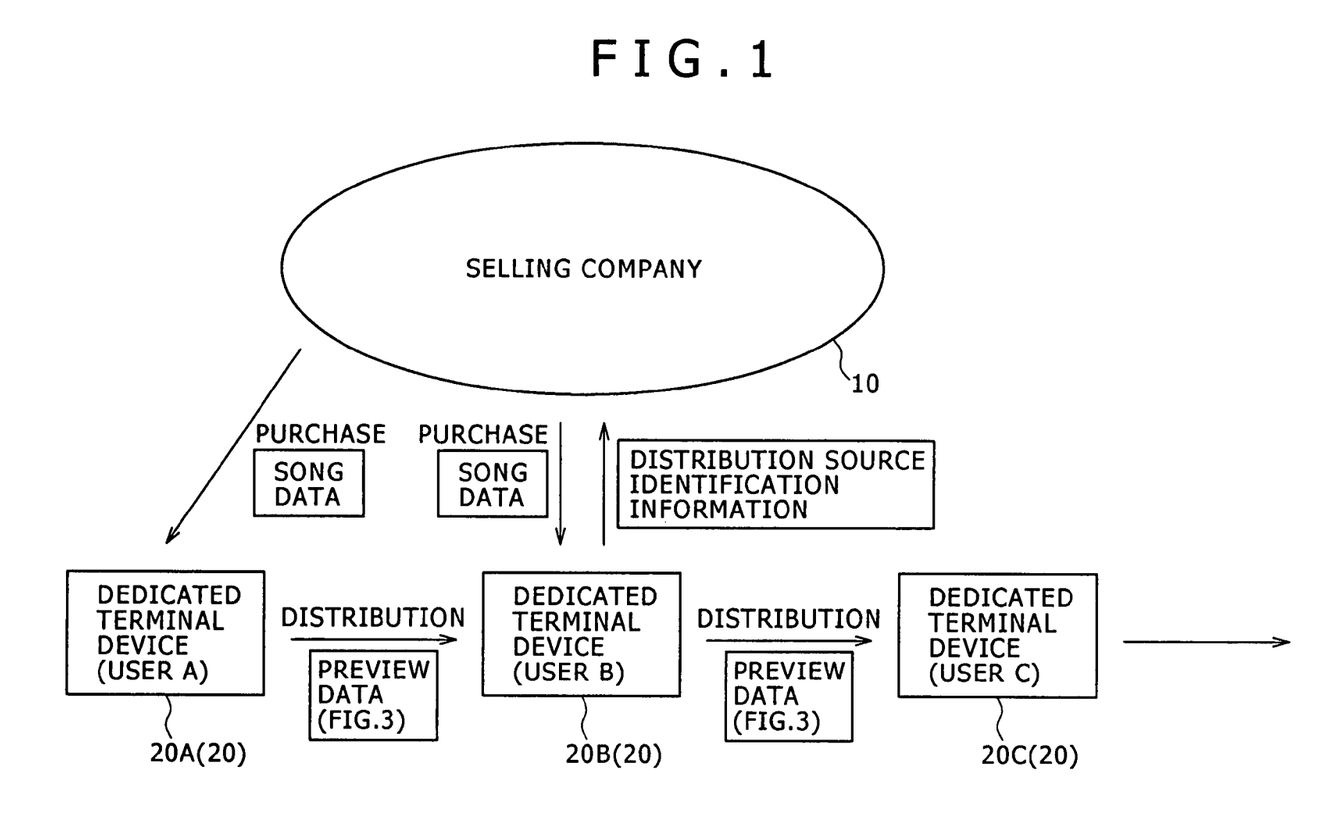
FIG. 1 is a schematic diagram illustrating an embodiment of the present invention.

FIG. 1 is a schematic diagram illustrating a typical configuration for a situation where an embodiment of the present invention is applied to a song data selling/purchasing system. The reference numeral 10 denotes a selling company that sells various song data. The reference numerals 20 (20A, 20B, 20C, . . . ) denote dedicated terminal devices that reproduce song data.

In the description of an embodiment of the present invention, it is assumed that the term "songs" includes information acoustically expressed, such as recitations of poems and stories, dramatic entertainment such as comic storytelling, comic dialogues, etc., speeches, news, and live sports events, in addition to general songs and various pieces of music.

Further, the term "songs" may include lyrics data, CD (Compact Disc) label photo data, liner note data, and other relevant data attached to musical content. For ease of understanding, the currently used example assumes that the dedicated terminal devices 20 can connect to a selling company 10 and purchase songs without using a personal computer.

The subsequent explanation assumes that terminal devices 20A, 20B, and 20C are possessed by users A, B, and C, respectively, and that user A purchases a song without accepting a recommendation from anyone and recommends the song to user B.

In an embodiment of the present invention, songs are distributed (recommended), sold, and purchased as described below.

Figure 3:
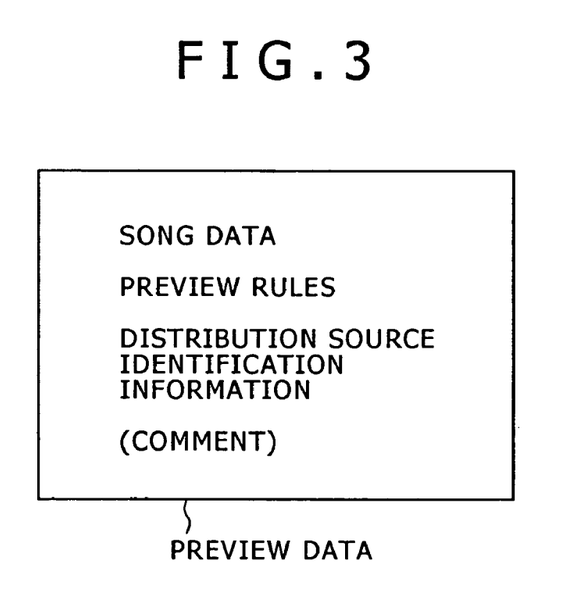
FIG. 3 illustrates an embodiment of the present invention.

(1) User A distributes preview data from terminal device 20A to terminal device 20B through a P2P network. In this instance, the preview data includes, for instance, song data, preview rules, distribution source information, and a comment as indicated in FIG. 3.

The data contained in the preview data will be described in detail later. However, the preview rules describe the permissions granted and other relevant information concerning a situation where song data is reproduced to listen to a song for previewing purposes. The preview rules are defined for each song data. The distribution source identification information is the data that identifies the distribution source for the preview data (terminal device 20A in the current example). The comment is the information that the distribution has prepared for the song to be recommended. In some cases, however, the comment is not included in the preview data.

(2) User B uses terminal device 20B to reproduce the song data, which is included in the preview data received from terminal device 20A, and listens to a song included in the song data. The preview rules mentioned under (1) above apply to such trial listening. Further, the comment can be used as the reference data for purchasing.

(3) When user B decides to purchase the song as a result of trial listening, he/she accesses the selling company 10, purchases the song, and downloads its song data to terminal device 20B.

In this instance, the distribution source identification information included in the preview data, which was transmitted from terminal device 20A to terminal device 20B as described in (1) above, is uploaded to the selling company 10. Therefore, the selling company 10 can recognize that the song sold to user B was recommended by user A.

(4) The selling company 10 rewards user A in accordance with the recognition result obtained in (3) above. For example, the selling company 10 gives points to user A in accordance with the evaluation of user A and the conditions given to the song.

Song distribution (recommendation), selling, and purchasing are accomplished as described above. When user B purchases the song recommended by user A, the system described above allows user A to obtain points, which can be used when, for instance, user A purchases a song in the future. In other words, user A will be rewarded.

User B may readily listen to a preview of a song through a P2P network in the same manner as he/she listens to a CD borrowed from a friend. If user A is a recommender who is highly evaluated by the selling company 10, songs recommended by user A may be purchased at a discount. Therefore, user B may purchase songs at a discount when they are recommended by user A.

The selling company 10 may allow the users to listen to a preview of a song without taking much trouble. When preview data is distributed from a distribution source (user A) to a distribution destination (user B), the associated distribution source identification information is distributed together with the preview data. Therefore, even when an illegal copy is made, the route for making such an illegal copy can be traced to inhibit an attempt to make illegal copies. Further, the point conversion conditions may be defined for each song and may easily be changed.

[2] Details of Song Data, Preview Rules, and Distribution Source Identification Information As indicated in FIG. 3, the preview data includes song data, preview rules, and distribution source identification information. The preview data may also include a comment when it is necessary. These elements will be described hereinafter.

[2-1] Song Data

The song data for a preview is audio data of song data for a sold song, that is, whole or part of formal song data, digital audio data having a lowered data rate, bandwidth-limited digital audio data, or the like. The format for the song data may vary from one song to another. For example, the song data may be MP3 (MPEG (Motion Picture Experts Group)-1/Audio Layer 3)-encoded and compressed.

[2-2] Preview Rules

As described earlier, the preview rules describe the permissions granted and other relevant information concerning a situation where the song data is reproduced to listen to a song for previewing purposes. The preview rules are defined for each song data.

Figure 4A:
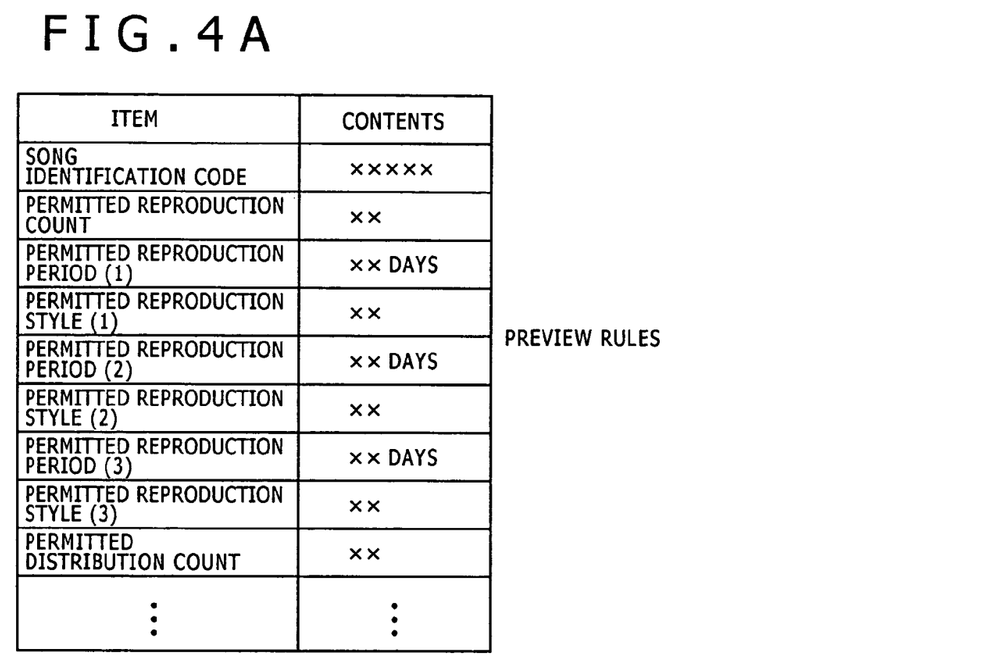
FIGS. 4A and 4B illustrate an embodiment of the present invention.

FIG. 4A shows a typical set of preview rules for the song data of a certain song. In the example shown in this figure, the preview rules include a song identification code, a permitted reproduction count, a permitted reproduction period, a permitted reproduction style, and a permitted distribution count.

The song identification code is the information for identifying the associated song or song data. The permitted reproduction count indicates the number of times the song data can be reproduced or previewed with a terminal device 20 at a distribution destination. The permitted reproduction period is a period during which the song data can be reproduced. The permitted reproduction style is a reproduction style that can be adopted during the permitted reproduction period.

When, for instance, song data is distributed from terminal device 20A to terminal device 20B, terminal device 20B may be able to preview the whole distributed song data on the day of song data reception. For the following three days, terminal device 20B may be able to preview the first 30 seconds of the song data. However, terminal device 20B may be unable to preview the song data for the subsequent period. Alternatively, terminal device 20B may be able to preview the whole distributed song data at the same sound quality level as that of the sold song data on the day of song data reception. For the following three days, terminal device 20B may be able to preview the song data at a low sound quality level that is provided by reducing the bit rate to half. However, terminal device 20B may be unable to preview the song data for the subsequent period.

The permitted distribution count is the number of times the song data can be distributed.

The preview rules can be changed in accordance with the evaluation of a distribution source user and the sales of the associated song. If, for instance, the ratio of the sales quantity of a song to the distribution count is relatively high in a situation where preview data is distributed by user A, user A becomes a highly evaluated recommender. As a result, the permitted distribution count for user A may be increased.

Alternatively, the preview rules may be made less stringent during a promotional campaign period for the song.

[2-3] Distribution Source Identification Information

As described earlier, the distribution source identification information is the data for identifying the terminal device 20 (distribution source user) that has distributed song data. The selling company 10 gives the distribution source identification information to a terminal device 20 when a song is purchased. The relationship between the distribution source identification information and terminal devices 20 is managed by a database of the selling company 10.

Figure 5A:
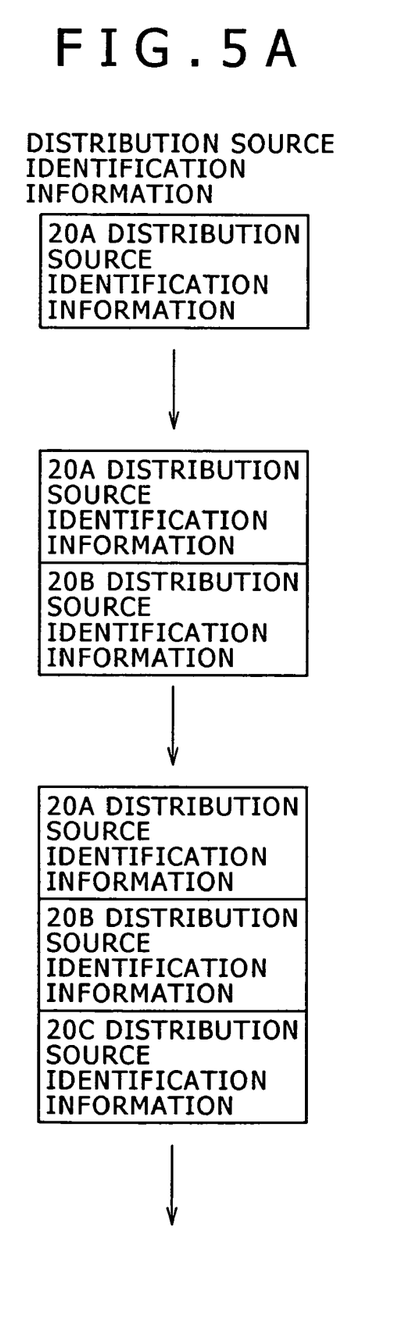
FIGS. 5A and 5B illustrate an embodiment of the present invention.
Figure 5B:
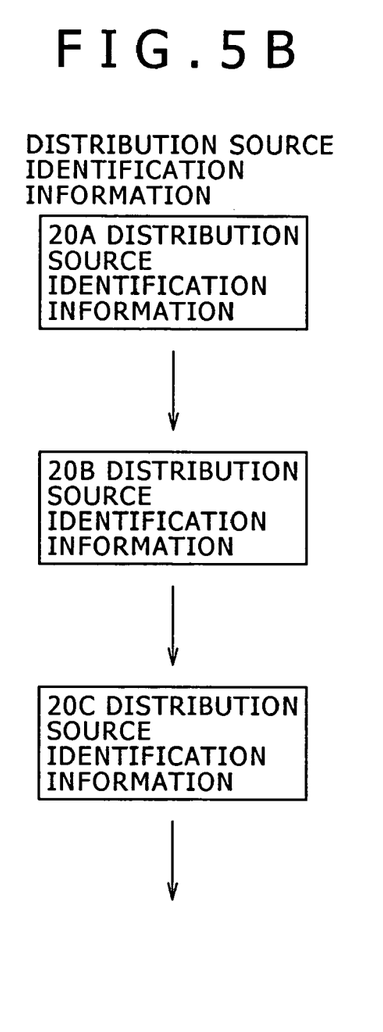

When, for instance, song data is distributed from terminal device 20A to terminal device 20B, from terminal device 20B to terminal device 20C, and so on, each terminal device 20 is a distribution source. Therefore, the distribution source identification information may be accumulated as indicated in FIG. 5A or may be updated to represent the last distribution source identification information as indicated in FIG. 5B. The selling company 10 chooses between these two methods.

[2-4] Comment

The selling company prepares the comment about the song to be sold or the distribution source user (recommender) prepares the comment about the song to be distributed. When, for instance, the selling company 10 sells song data, the selling company 10 may prepare the comment about the associated song, including an artist name, a lyric writer name, and a composer name. When, for instance, a user distributes song data to another user, the impression about the song may be prepared as the comment. However, the comment may not be added.

[2-5] Other (Supplement)

Within the preview data, at least the song data, preview rules, and distribution source identification information are integrated into a single whole. In this instance, the preview rules and distribution source identification information are encrypted.

[3] Details of System Configuration

Figure 2:
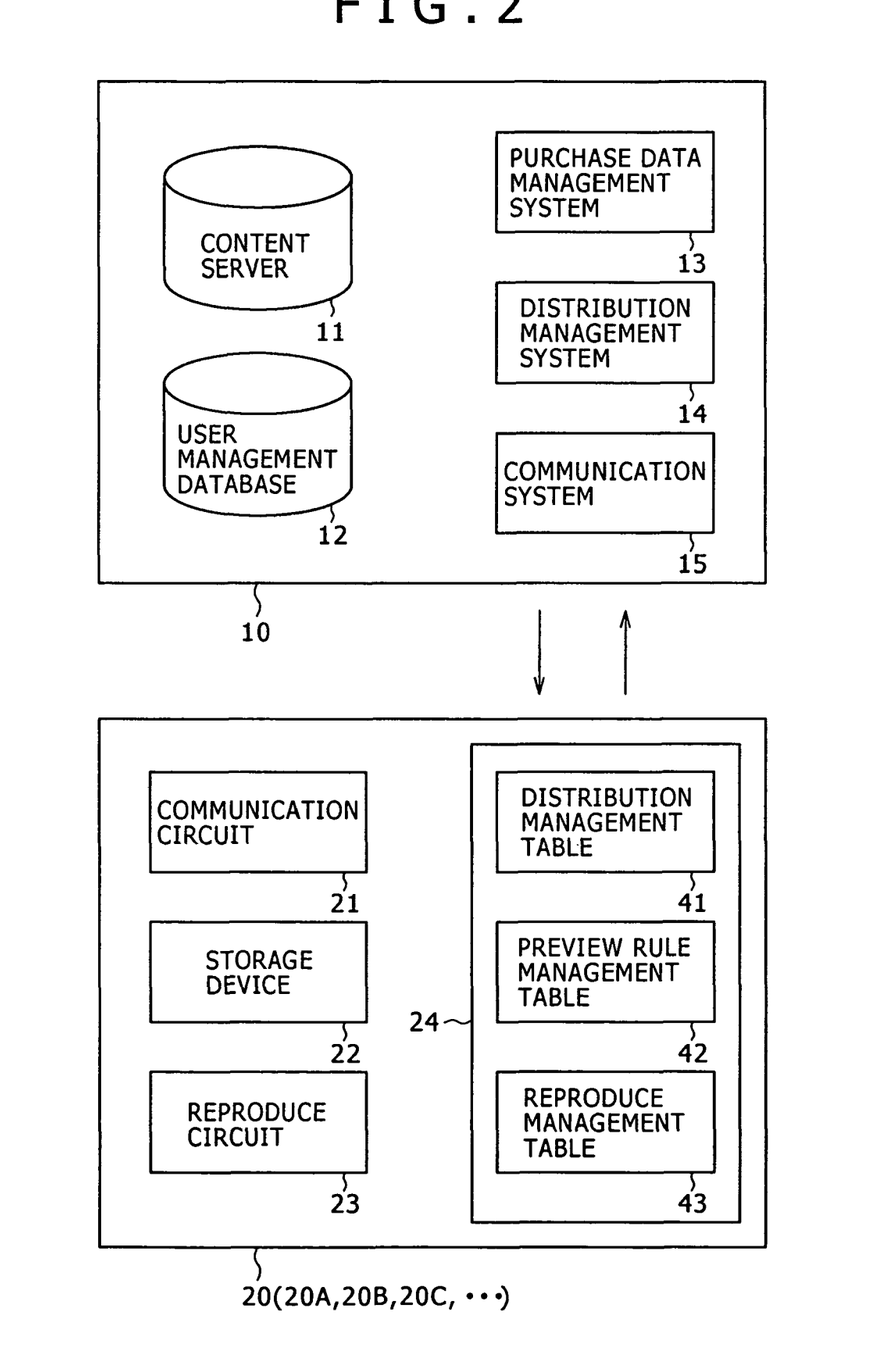
FIG. 2 is a schematic diagram illustrating elements according to an embodiment of the present invention.

FIG. 2 shows the details of typical elements of the system described with reference to FIG. 1. The selling company 10 shown in FIG. 2 is a song label company (seller) or a selling agent, which sells song data on-line. Therefore, the selling company 10 includes a content server 11 and a user management database 12.

The content server 11 stores a large number of song data to be sold. The song data stored in this server 11 may be PCM (Pulse Code Modulation) digital audio data for use, for instance, with a CD or may be digital audio data that is MP3-encoded and compressed. The user management database 12 manages the addresses, names, and other general items of information about users who purchased song data through the selling company 10. This database 12 also manages the distribution source identification information (information for identifying a user), individual song distribution records, the points to be converted, and other relevant user information on an individual user basis.

Further, the selling company 10 has a purchase data management system 13, a distribution management system 14, and a communication system 15. The purchase data management system 13 is a computer system that updates the data in the user management database 12 in accordance with the information conveyed from the terminal devices 20. The distribution management system 14 distributes song data and exercises song data distribution management. The communication system 15 connects the selling company 10 to a terminal device 20 and exchanges various data between the selling company 10 and the terminal device 20 when, for instance, a user purchases a song.

Each dedicated terminal device 20 is, for example, of a portable type. It may be shaped and sized so that it can fit into a pocket. Each terminal device 20 has a communication circuit 21, a storage device 22, a reproduce circuit 23, and a microcomputer 24 for system control. These hardware items are configured in the same manner as for a general reproduction apparatus that is capable of connecting to a network. In other words, the communication circuit 21 establishes a connection that is when the local dedicated device terminal exchanges various data with the selling company 10 and another dedicated terminal device 20. The connection between a terminal device 20 and the selling company 10 can be established by dial-up connection, ADSL (Asymmetric Digital Subscriber Line), FTTH (Fiber To The Home), or like method. The connection between the terminal devices 20 can be established by Bluetooth or the like.

The storage device 22 is used to store song data that is downloaded from the selling company 10. For example, it is a nonvolatile memory or small-size hard disc drive having a relatively large capacity. The reproduce circuit 23 reads song data stored in the storage device 22 and outputs the read song data as an audio signal. Therefore, the reproduce circuit 23 includes, for instance, a D/A converter circuit and a decoder circuit that decodes encoded song data. The microcomputer 24 exercises overall control over the terminal device 20 and controls the circuits 21 to 23.

Further, the microcomputer 24 is provided with a distribution management data table 41, a preview rule management table 42, and a reproduce management table 43, which are used to manage song data.

Figure 4B:
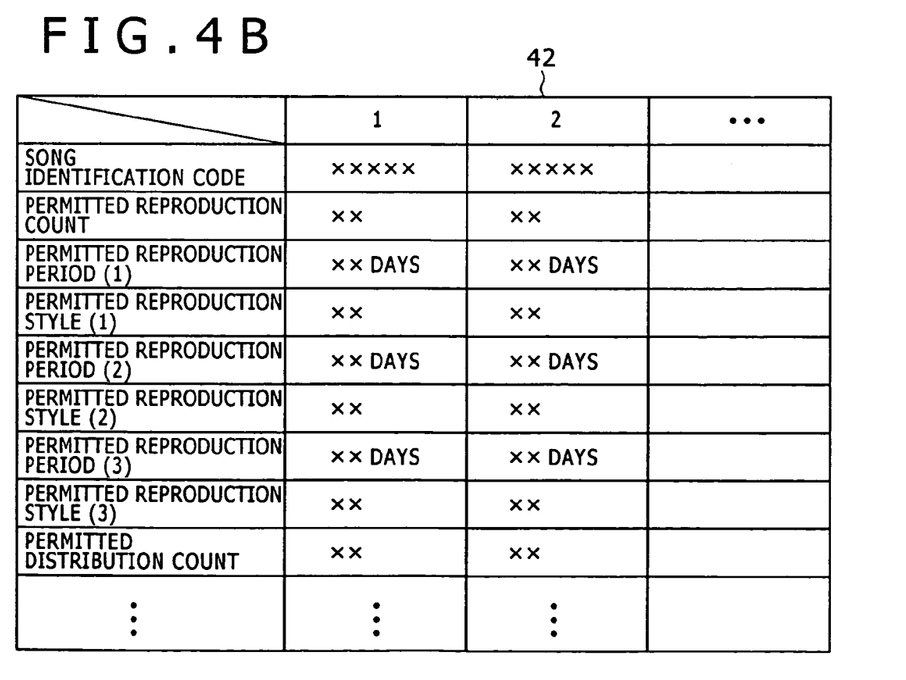

The distribution management data table 41 is used to manage the distribution record of each song, such as a distribution destination and distribution count, when song data is distributed to another terminal device 20. The preview rule management table 42 is a data table that has a collection of preview rules for various songs. When preview data is distributed from another terminal device 20, the preview rule management table 42 manages the preview rules contained in the preview data on an individual song data basis, as indicated in FIG. 4B. The reproduce management table 43 manages the reproduction record of song data, such as a distribution date and reproduction count, when the song data is distributed from another terminal device 20.

The microcomputer 24 also has various operating keys and a LCD (Liquid Crystal Display) panel, which are not shown, as user interfaces. These user interfaces are used to input/output user information and song information.

[4] Processes Performed to Recommend (Distribute), Sell, and Purchase a Song

The following explanation assumes that terminal devices 20A to 20C are owned by users A to C, respectively. It is also assumed that user A purchases a song that is not recommended by anyone, and recommends the purchased song to user B, and that user B purchases the recommended song and recommends it to user C.

[4-1] When User A Purchases a Song

User A purchases a target song on-line from the selling company 10. This purchase can be made in the same manner as for a general purchase. A predetermined purchase procedure is performed with terminal device 20A connected to the selling company 10 via the Internet or the like. In this instance, the name, the information about the purchased song, and other information input by user A are supplied to the purchase data management system 13 and stored in the user management database 12.

The song data for the purchased song is retrieved from the content server 11 in accordance with the purchase procedure performed by user A, and downloaded into the storage device 22 via the communication system 15 and via the communication circuit 21. When such a download is performed, the conditions for distributing the song data to another terminal device 20, that is, the preview rules, are also downloaded and stored in the preview rule management table 42 of terminal device 20A.

Subsequently, user A can operate terminal device 20A to freely listen to the purchased song. User A can also distribute the purchased song for previewing purposes.

[4-2] When User A Recommends a Song to User B

Users A and B connect terminal devices 20A and 20B by establishing a P2P network via the communication circuits 21 of terminal devices 20A and 20B, and send preview data from terminal device 20A to terminal device 20B.

In this instance, the song data contained in the preview data is the song data for a song that is to be recommended and is retrieved from the storage device 22. The preview rules are retrieved from the preview rule management table 42 in accordance with the song to be recommended. The distribution source identification information is the data that identifies terminal device 20A or user A. The comment is may be added by user A or may be added by the selling company. In this instance, the song data, preview rules, and distribution source identification information are integrated into a single whole to constitute preview data as described earlier.

Since the preview data is distributed to terminal device 20B, its distribution record is registered in the distribution management table 41 of terminal device 20A. The information contained in the distribution management table 41 is uploaded to the selling company 10 the next time terminal device 20A is connected to the selling company 10, and registered in the user management database 12 by the distribution management system 14. Therefore, the selling company 10 can grasp the distribution of user A (terminal device 20A).

The song data, which is included in the preview data sent from terminal device 20A, is then stored in the storage device 22 of terminal device 20B. The preview rules are stored in the preview rule management table 42.

[4-3] When User B Previews

The song data sent to terminal device 20B as described under [4-2] is reproduced for previewing purposes in accordance with the preview rules stored in the preview rule management table 42. In this instance, the reproduction state is registered in the reproduce management table 43, and control is exercised so that the resulting reproduction complies with the preview rules stored in the preview rule management table 42. For example, reproduction control is exercised so that the distributed song data can be entirely previewed on the day of song data reception, and that the first 30 seconds of the song data can be previewed for the following three days, and further that the song data may not be previewed for the subsequent period.

[4-4] When User B Purchases a Previewed Song

The procedure and process performed are basically the same as described under [4-1]. The purchased song data is downloaded into terminal device 20B and stored in the storage device 22. Further, the conditions for distributing the song data to another terminal device 20, that is, the preview rules, are stored in the preview rule management table 42.

In this instance, however, the information about user A, which is a recommender, that is, the distribution source identification information indicating user A, is uploaded to the selling company 10 in addition to the process performed as described under [4-1], and the number of points for user A, which is stored in the user management database 12, is increased by a predetermined amount.

In the above instance, the price at which user B purchases a song is discounted in accordance with the selling company's recommender evaluation of user A. For example, the evaluation value of user A is calculated as indicated below, and the discounted price is determined according to the evaluation value.

$$\text{User A evaluation value} = k \times S/D$$

where k is a discount coefficient, S is the number of songs that were actually sold due to user A's distribution, and D is the number of songs distributed by user A.

User B can then purchase a song at a discounted price and operate terminal device 20B to freely listen to the song. In addition, the number of points and evaluation of user A are increased.

[4-5] When User B Recommended a Song to User C

In this instance, the procedures and processes described under [4-2] and beyond are performed because the positions of users A, B, and C are merely shifted.

In this instance, however, the preview data sent from user B's terminal device 20B to user C's terminal device 20C is such that the distribution source identification information is either accumulated as indicated in FIG. 5A or updated to represent the last distribution source identification information as indicated in FIG. 5B depending on the setting employed by the selling company 10.

[4-6] When User C Purchases a Recommended Song

When user C purchases a song that is recommended by user B, the procedure and process performed are the same as described under [4-4]. However, the accumulated distribution source identification information (FIG. 5A) or the last distribution source identification information (FIG. 5B) is uploaded to the selling company 10 to increase the number of points for the associated user.

[5] Summary

Song recommendation, selling, and purchasing are achieved as described above. Therefore, when user B (distribution destination/not a recommender) purchases a song that is recommended by user A (distribution source/recommender), user A acquires points, that is, becomes rewarded.

User B can readily preview a song through a P2P network. User B can purchase a song at a discount in accordance with the selling company's evaluation of user A.

The selling company 10 can allow users to preview songs without taking much trouble. When the preview data is distributed, the distribution source identification information is distributed as well. Therefore, even when an illegal copy is made, the route for making such an illegal copy can be traced to inhibit an attempt to make illegal copies. Further, the point conversion conditions can be defined for each song and easily changed even after the start of song selling.

[6] Other

When, in the embodiment described above, a song is to be purchased from the selling company 10 without accepting anyone's recommendation as described with reference to user A, the preview rules, distribution source identification information, and comment can be inseparably combined with the song data for the song to constitute the preview data. In such an instance, the permitted reproduction period, which is defined as a part of the preview rules, may be set, for instance, to "indefinite."

When, in the embodiment described above, the song data included in the preview data is equal to the song data sold by the selling company 10, the preview rules for the song data in terminal device 20B can be changed as described earlier before selling instead of downloading the song data into terminal device 20B.

The embodiment described above assumes that the present invention is applied to a song selling system. However, the present invention can also be applied to a system that sells motion pictures, still pictures, the data in a database, or other content information. In such an instance, the terms "preview data" and "preview rules" are replaced by "trial use data" and "trial use rules," respectively. The embodiment described above assumes that the terminal devices 20 are dedicated portable apparatuses. However, the present invention can also be applied to a situation where the terminal devices 20 are stationary terminal devices, personal computers, or the like.

It should be understood by those skilled in the art that various modifications, combinations, sub-combinations, and alterations may occur depending on designs and other factors insofar as they are within the scope of the appended claims or the equivalents thereof.

What is claimed is:

1. A content information sales management method comprising:
    causing a distribution source apparatus to distribute trial content information, trial use rules stating trial use conditions, and distribution source identification information for identifying the distribution source apparatus to a distribution destination apparatus;
    causing the distribution destination apparatus to upload the distribution source identification information corresponding to the trial content information to a sales source apparatus when downloading formal content information corresponding to the trial content information; and
    causing the sales source apparatus to reward a user of the distribution source apparatus at least in part by updating an evaluation value corresponding to the distribution source identification information, in response to the downloading of the formal content information by the distribution destination apparatus.

2. A content information distribution management method comprising:
    causing a distribution source apparatus to distribute a combination of trial content information and trial use rules stating trial use conditions for the trial content information to a distribution destination apparatus, wherein the trial use rules state different trial use conditions for different periods during a permitted reproduction period for the trial content information; and
    causing the distribution destination apparatus to reproduce the trial content information in accordance with the trial use rules.

3. The content information distribution management method according to claim 2, wherein the trial content information is distributed in combination with distribution source identification information that identifies a distribution source for the trial content information corresponding to the distribution source apparatus.

4. The content information distribution management method according to claim 3, wherein the trial content information is distributed in combination with a comment about the trial content information.

5. A content information sales management method comprising:
    configuring a distribution source apparatus to enable the distribution source apparatus to distribute trial content information, trial use rules stating trial use conditions, and distribution source identification information for identifying the distribution source apparatus to a distribution destination apparatus;
    configuring the distribution destination apparatus to enable the distribution destination apparatus to upload the distribution source identification information corresponding to the trial content information to a sales source apparatus when downloading formal content information corresponding to the trial content information; and
    configuring the sales source apparatus to enable the sales source apparatus to reward a user of the distribution source apparatus at least in part by updating an evaluation value corresponding to the distribution source identification information, in response to the downloading of the formal content information by the distribution destination apparatus.

6. A content information distribution management method comprising:
    configuring a distribution source apparatus to enable the distribution source apparatus to distribute a combination of trial content information and trial use rules stating trial use conditions for the trial content information to a distribution destination apparatus, wherein the trial use rules state different trial use conditions for different periods during a permitted reproduction period for the trial content information; and
    configuring the distribution destination apparatus to enable the distribution destination apparatus to reproduce the trial content information in accordance with the trial use rules.

7. A content sales management method comprising:
    receiving, at a sales source apparatus, a request from a distribution destination apparatus to purchase formal content corresponding to trial content and distribution source identification information identifying a distribution source of the trial content; and
    in response to receiving the request and the distribution source identification information, rewarding the distribution source, wherein the rewarding comprises increasing an evaluation score for the distribution source.

8. A content sales management method comprising:
    receiving, at a sales source apparatus, a request from a distribution destination apparatus to purchase formal content corresponding to trial content and distribution source identification information identifying a distribution source of the trial content; and
    in response to receiving the request and the distribution source identification information, rewarding the distribution source, wherein the rewarding comprises awarding one or more points to the distribution source for use in future purchasing.

9. A content information distribution management method comprising:
    receiving, at a distribution destination apparatus, trial content information and trial use rules stating trial use conditions for the trial content information, wherein the trial use rules state different trial use conditions for different periods during a permitted reproduction period for the trial content information; and reproducing the trial content information in accordance with the trial use rules.

10. The content information distribution management method according to claim 9, wherein the trial content information has a lower data rate and/or a lower bandwidth than formal content information corresponding to the trial content information.

11. The content information distribution management method according to claim 9, wherein the trial use rules permit the trial content information to be reproduced during a first period during the permitted reproduction period, and only a portion of the trial content information to be reproduced during a second period during the permitted reproduction period.

12. The content information distribution management method according to claim 9, wherein the trial use rules permit the trial content information to be reproduced during a second period during the permitted reproduction period only at a lower data rate than during a first period during the permitted reproduction period.

* * * * *